United States Patent Office 3,001,989
Patented Sept. 26, 1961

3,001,989
6β,19-OXIDO ANDROSTANE DERIVATIVES
Howard J. Ringold and Albert Bowers, Mexico City, Mexico, assignors to Syntex S.A., Mexico City, Mexico, a corporation of Mexico
No Drawing. Filed July 29, 1960, Ser. No. 46,076
Claims priority, application Mexico Jan. 6, 1960
13 Claims. (Cl. 260—239.55)

The present invention relates to novel cyclopentanophenanthrene compounds and to a process for the production thereof.

More particularly the present invention relates to novel 6β,19-oxido androstanes having a keto, hydroxyl or acyloxy group at C-3 and at C-17 and which may also contain a hydrocarbon radical at C-17α and unsaturation at C-1,2 and C-4,5.

The novel compounds of the present invention which are of the androgenic type having anabolic activity together with low androgenicity are represented by the following formula:

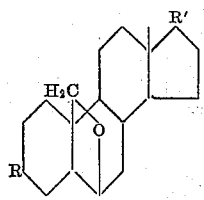

In the above formula R represents keto, β-hydroxy or β-acyloxy and R' represents keto,

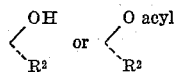

wherein R² represents hydrogen or an aliphatic hydrocarbon group, saturated or unsaturated, containing up to 8 carbon atoms. When R and R' are keto, double bonds may be present at C-1,2 and C-4,5.

The acyl groups are derived from hydrocarbon carboxylic acids containing up to 12 carbon atoms, saturated or unsaturated, of straight, branched, cyclic or cyclicaliphatic chain, aromatic and may be substituted by functional groups such as hydroxyl, acyloxy of up to 12 carbon atoms, alkoxy of up to 8 carbon atoms, amino or halogen. Typical ester groups include the acetate, propionate, butyrate, hemisuccinate enanthate, caproate, benzoate, phenoxyacetate, trimethylacetate, aminoacetate, cyclopentylpropionate and β-chloropropionate.

Typical aliphatic hydrocarbon groups at C-17α are methyl, ethyl, propyl, butyl, vinyl, 1-propenyl, 2-butenyl, ethinyl and 1-butinyl.

The novel oxido compounds of the present invention also lower the blood cholesterol levels, are cardiac antifibrillatory agents, have analgesic properties and are bacteriostatic against gram positive bacteria.

The novel compounds of the present invention are prepared by a process illustrated by the following equation:

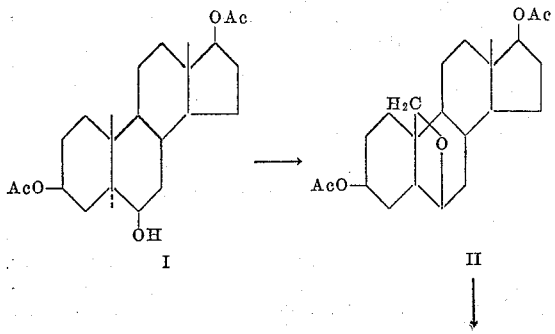

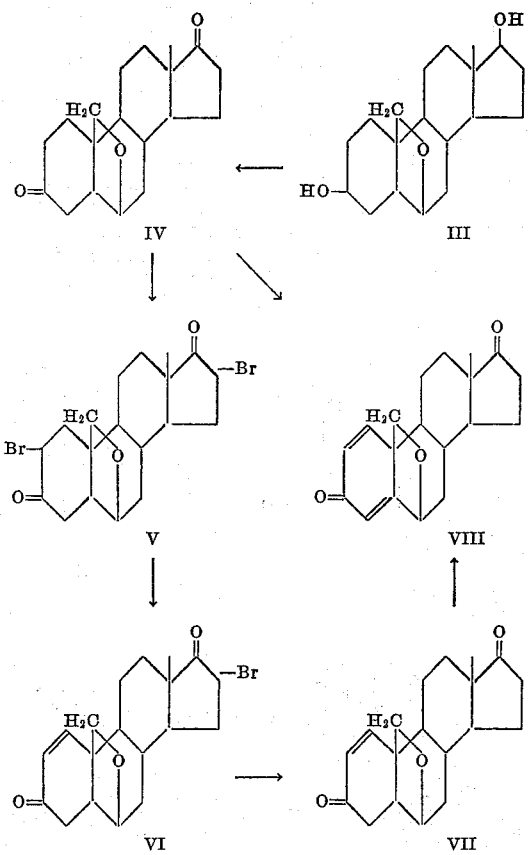

In the above equation Ac represents the acetyl radical; however, other acyl groups may be substituted therefor.

In practicing the process outlined above, the starting material, 3β,17β-diacetoxy-androstan-6β-ol, described by Shopee et al., J. Chem. Soc., 1953, 245, can be conveniently prepared by reacting the diacetate of Δ⁵-androstenediol with hypobromous acid to form the 3,17-diacetate of 5α-bromo-androstane-3β,6β,17β-triol which upon subsequent oxidation with 8 N chromic acid is transformed into 5α-bromo-androstane-3β,17β-diol-6-one. The latter compound is reductively debrominated to form the diacetate of androstane-3β,17β-diol-6-one which is then hydrogenated to produce the desired 3,17-diacetate of androstane-3β,6β,17β-triol (I).

The latter compound (I) is treated with lead tetraacetate, preferably in a solvent such as benzene at reflux temperature. Other solvents which are inert to the reaction, for example, aromatic hydrocarbons such as toluene, xylene or ethers such as dioxane, tetrahydrofurane, the methyl ethers of propylene glycol or halogenated alphatic hydrocarbons such as carbon tetrachloride may replace the benzene and the reaction may then proceed below the boiling point of the solvent. The thus formed diacetate of 6β,19-oxido-androstane-3β,17β-diol (II) is hydrolyzed as by refluxing with dilute methanolic potassium hydroxide to form the free diol, namely, 6β,19-oxido-androstane-3β,17β-diol (III) which is oxidized by reaction with 8 N chromic acid to form the 6β,19-oxido-androstane-3,17-dione (IV).

For introduction of a double bond at C-1,2 the latter compound (IV) is treated with two molar equivalents of bromine in acetic acid containing a trace of hydrogen bromide, at room temperature; the thus formed 2,16-dibromo-6β,19-oxido-androstane-3,17-dione (V) is selectively dehydrobrominated at C-2 by refluxing with calcium carbonate in mixture with dimethylformamide for about half an hour to form the 16-bromo-6β,19-oxido-Δ¹-androstene-3,17-dione (VI). For complete dehydrobromination the latter compound is dissolved in acetone and treated for a short time with an excess of chromous chloride at 0° C. to thus form 6β,19-oxido-Δ1-androstene-3,17-dione (VII). By refluxing the latter compound in dioxane with 2,3-dichloro-5,6-dicyano-1,4-benzoquinone for a period of time in the order of 20 hours, there is formed the 6β,19-oxido - Δ¹,⁴ - androstadiene-3,17-dione (VIII). Alternatively the latter compound may be formed directly from 6β,19-oxido-androstane-3,17-dione (IV) by refluxing for 24 hours with the 2,3-dichloro-5,6-dicyano-1,4-benzoquinone in dioxane solution.

The following equation illustrates a method for the introduction of a 17α-aliphatic hydrocarbon-17β-hydroxy grouping:

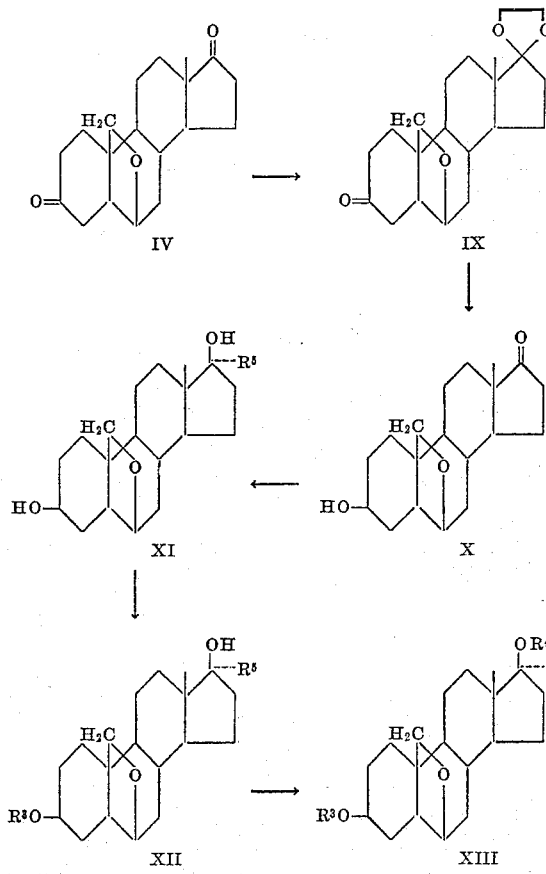

In the above equation, R³ and R⁴ represent hydrogen or a hydrocarbon carboxylic acyl group of the type mentioned hereinabove and R⁵ represents an aliphatic hydrocarbon radical saturated or unsaturated, containing up to 8 carbon atoms.

The 17-keto group of 6β,19-oxido-androstane-3,17-dione (IV) is preferentially protected by formation of the C-17 cycloalkyleneketal, achieved by refluxing the 6β,19-oxido-androstane-3,17-dione with a dihydric alcohol such as ethylene glycol in a solvent such as benzene and in the presence of p-toluenesulfonic acid for about 6 hours followed by subsequent reduction of the thus formed 6β,19 - oxido - 17 - ethylenedioxy-androstane-3-one (IX) with a double metal hydride such as sodium borohydride to produce 6β,19-oxido-17-ethylenedioxy-androstane-3β-ol which is converted by treatment with p-toluenesulfonic acid in acetone into 6β,19-oxido-androstan-3β-ol-17-one (X). The latter compound is then reacted with an aliphatic hydrocarbon magnesium halide to convert the 17-keto group into the 17β-hydroxy-17α-aliphatic hydrocarbon grouping. Thus, by reaction with methyl magnesium bromide, the 17α-methyl-17β-hydroxy grouping is formed and by similar reaction with an ethyl, vinyl, ethinyl or butenyl Grignard reagent, there is formed the 17β-hydroxyl compound with the respective aliphatic hydrocarbon radical at C-17α. Alternatively, the 17α-ethyl group is introduced by reaction with ethyl-lithium and the ethinyl group can be introduced by the conventional reaction with potassium acetylide. The thus formed 6β,19-oxido-17α-hydrocarbon-androstane-3β,17β-diol (XI) is esterified by conventional methods with a hydrocarbon carboxylic acid anhydride or chloride containing up to twelve carbon atoms of the type heretofore mentioned to produce the corresponding 3-monoesters (XII). Esterification of the tertiary hydorxyl group at C-17β is effected by reaction with the acid anhydride in benzene solution and in the presence of catalytic amounts of p-toluenesulfonic acid, with simultaneous esterification of a free hydroxyl group at C-3 (XIII). By these esterification methods there is prepared 3-mono esters as well as 3,17-diesters having identical ester groups or ester groups different from each other.

The diesters of 6β,19-oxido-17α-aliphatic hydrocarbon-androstane-3β,17β-diol (XIII) are also useful intermediates for the preparation of the novel 6,19-lactones having an aliphatic hydrocarbon radical at C-17α, which lactones are hypotensive agents having bacteriostatic activity against gram positive bacteria as well as anabolic agents having low androgenicity and are also useful in the treatment of premenstrual tension.

The conversion of the 6β,19-oxido diesters into the lactones may be illustrated by the following equation:

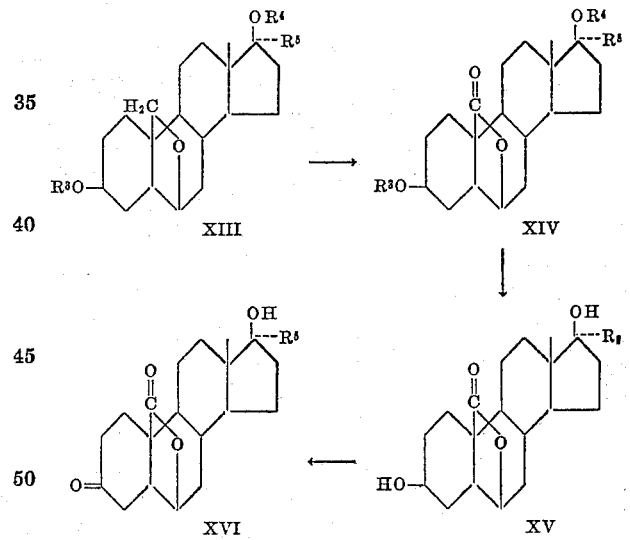

In the above equation, R³, R⁴ and R⁵ have the same meaning as previously set forth.

In practicing the above process, a diester of 6β,19-oxido-17α-aliphatic hydrocarbon - androstane-3β,17β-diol (XIII) is oxidized by reaction with chromium trioxide in acetic acid under reflux condition to form the corresponding diester of the 6,19-lactone of 17α-aliphatic hydrocarbon-androstane-3β,6β,17β-triol-19-carboxylic acid (XIV). Upon alkaline hydrolysis of the ester groups, there is formed the 6,19-lactone of the 17α-aliphatic hydrocarbon-androstrane - 3β,6β,17β - triol-19-carboxylic acid (XV) which upon oxidation with chromic acid in aqueous acetic acid is converted into the 6,19-lactone of 17α-aliphatic hydrocarbon androstane-6β,17β-diol-3-one-19-carboxylic acid.

The following examples serve to illustrate but are not intended to limit the scope of the present invention:

*Example 1*

A suspension of 10 g. of the diacetate of Δ⁵-androstene-3β,17β-diol in 100 cc. of dioxane was treated with 12 cc. of 0.46 N perchloric acid and then with 4 g. of N-bromoacetamide; the N-bromoacetamide was added little by little, with stirring, in the course of 1 hour, in the dark and maintaining the temperature around 15° C. The mixture was stirred for 1 hour further in the dark at room temperature; it was then decolorized by the addition of 10% aqueous sodium bisulfite solution, 1 lt. of water was added and the product was extracted with methylene chloride; the extract was washed with water, dried over anhydrous sodium sulfate and the solvent was evaporated under reduced pressure and at room temperature. The residue consisted of the 3,17-diacetate of 5α-bromo-androstane-3β,6β,17β-triol.

There was prepared 100 cc. of an 8 N solution of chromic acid from 26.7 g. of chromium trioxide, 23 cc. of concentrated sulfuric acid and distilled water. A solution of 10 g. of the 3,17-diacetate of 5α-bromo-androstane-3β,6β,17β-triol in 100 cc. of acetone was cooled to 0° C. and treated with the 8 N solution of chromic acid until the characteristic color of chromium trioxide persisted in the mixture. The 8 N solution of chromic acid was added in a slow stream, under an atmosphere of nitrogen, with stirring and at 0° C. The mixture was then stirred at 0° C. under an atmosphere of nitrogen for 2 minutes further, poured into ice water and the precipitate was collected by filtration, washed with water and dried under vacuum, thus affording the diacetate of 5α-bromo-androstane-3β,17β-diol-6-one.

A mixture of the above compound, 10 g. of zinc dust and 250 cc. of glacial acetic acid was heated at 90° for 2 hours, at the end of which it was filtered through celite under an atmosphere of nitrogen and the filtrate was concentrated to a small volume under reduced pressure; after cooling it was diluted with ice water and the precipitate of the diacetate of androstane-3β,17β-diol-6-one was collected by filtration, washed with water and dried.

The above crude diacetate of androstane-3β,17β-diol-6-one was dissolved in a mixture of 80 cc. of absolute ethanol and 120 cc. of glacial acetic acid and hydrogenated in a "Parr" instrument at 50 atmospheres, in the presence of 1.2 g. of platinum oxide, with vigorous stirring and at room temperature for 24 hours; the catalyst was then removed by filtration and the filtrate was evaporated to dryness under reduced pressure; the residue was purified by chromatography on neutral alumina. There was thus obtained the 3,17-diacetate of androstane-3β,6β,17β-triol, M.P. 130–132° [α]$_D$—24°.

*Example II*

To a solution of 4 g. of the 3,17-diacetate of androstane-3β,6β,17β-triol in 150 cc. of anhydrous benzene was added 6 g. of lead tetraacetate and the mixture was refluxed for 18 hours. After filtering the filtrate was diluted with water, the benzene layer was separated, washed with water and the benzene was evaporated under reduced pressure; by chromatography of the residue on neutral alumina, there was obtained the diacetate of 6β-19-oxido-androstane-3β,17β-diol; M.P. 140–141° C. [α]$_D$+24.5° (chloroform).

A solution of 2.0 g. of the above compound in 100 cc. of 2% methanolic potassium hydroxide solution was kept overnight at room temperature and then acidified with 2 N hydrochloric acid. The mixture was heated for half an hour on the steam bath, cooled, diluted with ice water and the product was extracted with several portions of ether. The combined extract was washed with water, dried over anhydrous sodium sulfate and the ether was evaporated. There was thus obtained the 6β,19-oxido-androstane-3β,17β-diol, M.P. 184–186° [α]$_D$—2°.

*Example III*

The above compound was dissolved in acetone, cooled to 0° C. and treated with a slow stream of 8 N chromic acid (prepared in the same manner as described in Example I) under an atmosphere of nitrogen, with stirring and at 0° C. The precipitate was collected by filtration, washed with water and dried under vacuum to thus afford the 6β,19-oxido-androstane-3,17-dione, M.P. 165–167°; [α]$_D$+125°.

A mixture of 1.0 g. of the latter compound, 50 cc. of dioxane and 5.0 g. of 2,3-dichloro-5,6-dicyano-1,4-benzoquinone was refluxed for 24 hours. The mixture was cooled, filtered and the solvent was evaporated under reduced pressure. Recrystallization from acetone-hexane yielded the 6β-19-oxido-Δ$^{1,4}$-androstadiene-3,17-dione.

*Example IV*

To 2 g. of 6β,19-oxido-androstane-3,17-dione (prepared in the previous example) in 100 cc. of glacial acetic acid there was added 2 molar equivalents of bromine dissolved in glacial acetic acid containing a trace of hydrogen bromide, with continuous stirring. After 4 hours at room temperature water was added and the crude dibromide was collected. The crude product, 2,16-dibromo-6β,19-oxido-androstane-3,17-dione in 20 cc. of dimethylformamide was added to a boiling suspension of 1.5 g. of calcium carbonate in 30 cc. of dimethylformamide and the mixture was refluxed for 30 minutes. The solution was cooled, filtered and the filtrate was washed with dilute hydrochloric acid, sodium carbonate solution and water. The dried extract was evaporated and the residue was chromatographed on 50 parts of neutral alumina to furnish 6β,19-oxido-16-bromo-Δ$^1$-androstene-3,17-dione.

A solution of chromous chloride was prepared as follows: A mixture of 20 g. of zinc dust, 1.6 g. of mercuric chloride, 20 cc. of water and 1 cc. of concentrated hydrochloric acid was stirred for 5 minutes in an atmosphere of carbon dioxide and the supernatant liquid was decanted; there was then added 40 cc. of water and 4 cc. of concentrated hydrochloric acid and finally 10 g. of chromic chloride in portions, under vigorous stirring and under an atmosphere of carbon dioxide. There was thus obtained a dark blue solution of chromous chloride.

The 6β,19-oxido-16-bromo-Δ$^1$-androstene - 3,17 - dione was then dissolved in 100 cc. of acetone and treated little by little under an atmosphere of carbon dioxide with 20 cc. of the chromous chloride solution. The mixture was kept at 0° C. and stirred from time to time and after 15 minutes, the product was precipitated by the addition of water, collected by filtration, washed with water, dried under vacuum and recrystallized from acetone, thus yielding 6β,19-oxido-Δ$^1$-androstene-3,17-dione.

*Example V*

To 1.0 g. of 6β,19-oxido-Δ$^1$-androstene-3,17-dione in 50 cc. of dioxane, there was added 3.0 g. of 2,3-dichloro-5,6-dicyano-1,4-benzoquinone and the mixture was refluxed for 20 hours. After the usual work-up, there was obtained 6β,19-oxido-Δ$^{1,4}$-androstadiene-3,17-dione, identical with the product formed in Example III.

*Example VI*

A mixture of 1.0 g. of 6β,19-oxido-androstane-3,17-dione (cf. Example III), 8 cc. of ethylene glycol, 0.15 g. of p-toluenesulfonic acid and 100 cc. of benzene was refluxed for six hours with concomitant slow azeotropic distillation. The resulting solution was cooled, washed with an aqueous solution of potassium carbonate and evaporated to dryness. Recrystallization of the residue from heptane afforded the 6β,19-oxido-17-ethylenedioxy-androstan-3-one.

To a solution of 2.0 g. of the above compound in 50 cc. of aqueous tetrahydrofuran, there was slowly added a solution of 0.5 g. of sodium borohydride in 10 cc. of water under stirring at room temperature and the stirring was continued for three hours. The excess of hydride was decomposed by the addition of acetic acid, the solution was concentrated to a small volume and then diluted with water. The product was extracted with ethyl acetate and the extract was washed with water, dried and evaporated. Upon recrystallization from acetone-hexane, there was obtained 6β,19-oxido-17-ethylenedioxy-androstane-3β-ol.

The 17-ketal group was cleaved by treating the latter compound with 50 mg. of p-toluenesulfonic acid in 12 cc. of acetone, allowing the mixture to stand overnight at room temperature. Upon addition of water, there was furnished 6β,19-oxido-androstan-3β-ol-17-one.

Example VII

A mixture of the above compound, 200 cc. of thiophene-free anhydrous benzene and 45 cc. of a 3 N solution of methyl magnesium bromide was refluxed for 6 hours; the mixture was then poured into 800 cc. of water containing 80 g. of ammonium chloride and 800 g. of crushed ice, with vigorous stirring. The benzene layer was separated, washed with dilute hydrochloric acid and then with water to neutral, dried over anhydrous sodium sulfate and the benzene was evaporated. Crystallization from acetone-hexane afforded 17α-methyl-6β,19-oxido-androstane-3β,17β-diol.

A mixture of 2.0 g. of 17α-methyl-6β,19-oxido-androstane-3β,17β-diol, 10 cc. of pyridine and 10 cc. of acetic anhydride was allowed to remain overnight at room temperature. After the usual work-up, there was obtained the 3-monoacetate of 17α-methyl-6β,19-oxido-androstane-3β,17β-diol.

In a similar conventional manner, there was also prepared the propionate, butyrate, benzoate and cyclopentylpropionate.

Example VIII

Upon treatment with acetic anhydride in benzene solution and in the presence of p-toluenesulfonic acid, the 3-monoacetate of 6β,19-oxido-17α-methyl-androstane-3β,17β-diol was converted into the corresponding 3,17-diacetate.

Example IX

By substituting propionic anhydride in the method of the preceding example, there was prepared the 3-acetate-17-propionate of 6β,19-oxido-17α-methyl-androstane-3β,17β-diol.

Other diesters such as the 3-propionate-17-acetate; 3-benzoate-17-acetate; and 3,17-dibutyrate were also prepared by substituting the appropriate acid anhydrides.

Example X

To a solution of 2 g. of 6β,19-oxido-androstan-3β-ol-17-one in 250 cc. of absolute ether was added little by little a solution of 10 molar equivalents of ethyl lithium in 50 cc. of ether with mechanical stirring and under an atmosphere of nitrogen.

The mixture was then stirred for 48 hours at room temperature and under an atmosphere of nitrogen; after pouring into water, the mixture was acidified with hydrochloric acid stirring vigorously for 1 hour. The ether layer was separated, washed with water to neutral, dried over anhydrous sodium sulfate, filtered and the ether was evaporated from the filtrate. Recrystallization of the residue from acetone-hexane yielded 17α-ethyl-6β,19-oxido-androstane-3β,17β-diol.

Conventional esterification with acetic anhydride yielded the corresponding 3-mono-acetate which upon further reaction with acetic anhydride in benzene solution and in the presence of p-toluenesulfonic acid was converted into the 3,17-diacetate.

Example XI

A solution of 1 g. of potassium metal in 50 cc. of t-butanol was prepared under an atmosphere of nitrogen, cooled to 0° C. and treated with a cold solution of 1 g. of 6β,19-oxido-androstan-3β-ol-17-one (cf. Example VI), little by little, under an atmosphere of nitrogen, at 0° C. and under continuous stirring. The nitrogen was then substituted by dry purified acetylene and a stream of this gas introduced into the mixture for 40 hours. The solution was then poured into 200 cc. of dilute hydrochloric acid, stirred for 1 hour at room temperature and the organic solvents were removed by steam distillation. The residue was cooled, the solid collected and recrystallized from acetone-hexane, thus furnishing 17α-ethinyl-6β,19-oxido-androstane-3β,17β-diol.

A solution of 500 mg. of the above compound in 10 cc. of pyridine containing 100 mg. of a pre-reduced palladium on calcium carbonate catalyst was hydrogenated at room temperature until the equivalents of 1 mol of hydrogen had been absorbed; the catalyst was removed by filtration; the pyridine was evaporated under reduced pressure and the residue was triturated with 20 cc. of 1% hydrochloric acid; the product was extracted with ethyl acetate and the extract was washed with water, dried over anhydrous sodium sulfate and evaporated to dryness. By chromatography on neutral alumina there was obtained 17α-vinyl-6β,19-oxido-androstane-3β,17β-diol.

By applying the methods of esterification described in Examples VII, VIII and IX there were obtained the 3-monoacetates; 3,17-diacetates; 3-acetate, 17-propionate; 3-propionate,17-acetate; 3-benzoate-17-acetate and 3,17-dibutyrates of 17α-vinyl-6β,19-oxido-androstane-3β,17β-diol and of 17α-ethinyl-6β,19-oxido-androstane-3β,17β-diol.

Example XII

To a solution of 2.5 g. of the diacetate of 17α-methyl-6β,19-oxido-androstane-3β,17β-diol (prepared in Example VIII) in 50 cc. of acetic acid was added 2.5 g. of chromium trioxide dissolved in 100 cc. of 90% acetic acid, and the mixture was kept at 90° for 1 hour. Finally the product was precipitated by the addition of ice water, collected and recrystallized from acetone-hexane, thus affording the 6,19-lactone of 3β,17β-diacetoxy-17α-methyl-androstan-6β-ol-19-carboxylic acid.

A solution of 2 g. of the above compound in 100 cc. of 2% methanolic potassium hydroxide solution was kept at room temperature overnight and then acidified with 2 N hydrochloric acid. The mixture was heated for half an hour on the steam bath, cooled, diluted with ice water and the product was extracted with several portions of ether. The combined extract was washed with water, dried over anhydrous sodium sulfate and the ether was evaporated. There was thus obtained the 6,19-lactone of 17α-methyl-androstane - 3β,6β,17β-triol-19-carboxylic acid.

Example XIII

By substituting in the preceding example the 3,17-diacetate of 17α-methyl-6β,19-oxido-androstane-3β,17β-diol by the 3,17-diacetate of 17α-ethyl-6β,19-oxido-androstane-3β,17β-diol, there was obtained the 6,19-lactone of 17α-ethyl - 3β,17β-diacetoxy-androstan-6β-ol-19 - carboxylic acid and finally 6,19-lactone of 17α-ethyl-androstane-3β,6β,17β-triol-19-carboxylic acid.

In a similar manner, the 3,17-diacetate of 17α-ethinyl-6β,19-oxido-androstane-3β,17β-diol was converted into the corresponding 6,19-lactone and finally into the free alcohol.

By substituting the diacetate by other diesters such as by the 3-acetate-17-propionate; 3-propionate-17-acetate; 3-benzoate-17-acetate and the 3,17-dibutyrate in the above described method, there were formed the 6,19-lactones of the corresponding esters of 17α-methyl-androstane-3β,6β,17β-triol-19-carboxylic acid, of 17α-ethyl-androstane-3β,6β,17β-triol-19-carboxylic acid; and of 17α-ethinyl-androstane-3β,6β,17β-triol-19-carboxylic acid.

Example XIV

By partial hydrogenation of the 6,19-lactone of 17α-ethinyl-3β,17β-diacetoxy-androstan - 6β-ol-19-carboxylic acid, described in the preceding example, there was formed the 6,19-lactone of 3β,17β-diacetoxy-17α-vinyl-androstan-6β-ol-19-carboxylic acid.

Thus 1.0 g. of the 6,19-lactone of 3β,17β-diacetoxy-17α-ethinyl-androstan-6β-ol-19-carboxylic acid in 20 cc. of pyridine containing 200 mg. of a catalyst consisting of 2% palladium on barium sulfate was hydrogenated at room temperature. After 35 minutes, the uptake of hydrogen was 1.05 mols and had virtually ceased. The catalyst was removed by filtration through celite, the pyridine was evaporated under reduced pressure and the crude reaction product was purified by crystallization from acetone-hexane to give the pure product, the 6,19-lactone of 3β,17β-diacetoxy-17α-vinyl-androstan-6β-ol-19- carboxylic acid.

By following the method described in Example XII, the above compound was converted into the free alcohol, namely, the 6,19-lactone of 17α-vinyl-androstane-3β,6β,17β-triol-19-carboxylic acid.

Example XV

By substituting in the method of the previous example, the 6,19-lactone of 3β,17β-diacetoxy-17α-ethinyl-androstan-6β-ol-19-carboxylic acid by the other diesters described in Example XIII, namely the 3-acetate-17-propionate; 3-propionate-17-acetate; 3-benzoate-17-acetate; and the 3,17-dibutyrate of the 6,19-lactone of 17α-ethinyl-androstane-3β,6β,17β-triol-19-carboxylic acid, there were formed the corresponding diesters of the 6,19-lactone of 17α-vinyl-androstan-3β,6β,17β-triol-19-carboxylic acid.

Example XVI

A mixture of 2.0 g. of the 6,19-lactone of 17α-methyl-androstane-3β,6β,17β-triol-19-carboxylic acid, and 100 cc. of 90% acetic acid was treated with a solution of 450 mg. of chromium trioxide in 25 cc. of 90% acetic acid for ½ hour and maintaining the temperature below 20° C. It was then kept at 25° C. for 3 hours, poured into water and the product was extracted with methylene chloride. The extract was washed with aqueous sodium bicarbonate solution and with water to neutral, dried over anhydrous sodium sulfate and evaporated. Recrystallization of the residue from acetone-hexane yielded the 6,19-lactone of 17α-methyl-androstane-6β,17β-diol-3-one-19 - carboxylic acid.

Example XVII

By substituting in the preceding example the 6,19-lactone of 17α-methyl-androstane-3β,6β,17β-triol-19-carboxylic acid by the 6,19-lactone of 17α-ethyl-androstane-3β,6β,17β-triol-19-carboxylic acid, the 6,19-lactone of 17α-ethinyl-androstane-3β,6β,17β-triol-19-carboxylic acid or by the 6,19-lactone of 17α-vinyl-androstane-3β,6β,17β-triol-19-carboxylic acid and following the procedure described in such example, there were prepared the 6,19-lactone of 17α-ethyl-androstane-6β,17β-diol-3-one-19-carboxylic acid, the 6,19-lactone of 17α-ethinyl-androstane-6β,17β-diol-3-one-19-carboxylic acid and the 6,19-lactone of 17α-vinyl-androstane-6β,17β-diol-3-one-19-carboxylic acid.

Example XVIII

A solution of 2 g. of 17α-methyl-6β,19-oxido-androstane-3β,17β-diol in 20 cc. of acetone was treated with an excess of an 8 N solution of chromic acid in accordance with the method described in Example I. After the usual work up there was obtained 17α-methyl-6β,19-oxido-androstan-17β-ol-3-one.

A mixture of 1 g. of the above compound, 50 cc. of acetic acid, 25 cc. of acetic anhydride and 1 g. of p-toluenesulfonic acid was allowed to stand at room temperature for 1 hour, it was then poured into water stirred until the excess of anhydride was hydrolized, and the crystalline product collected by filtration. The total product was dissolved in 20 cc. of methanol and treated at room temperature for 12 hours with 250 mg. of potassium hydroxide; the solution was poured into water, the precipitate filtered, dried and recrystallized from acetone-ether thus giving the acetate of 17α-methyl-6β,19-oxido-androstan-17β-ol-3-one.

Example XIX

In accordance with the method of the preceding example, 17α-ethyl-6β,19-oxido-androstane-3β,17β-diol and 17α-ethinyl-6β,19-oxido-androstane-3β,17β-diol were converted, respectively into 17α-ethyl-6β,19-oxido-androstan-17β-ol-3-one and 17α-ethinyl-6β,19-oxido-androstan-17β-ol-3-one.

We claim:
1. A compound of the following formula:

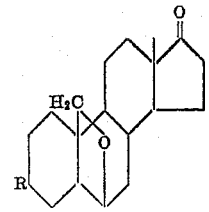

wherein R is selected from the group consisting of keto, β-hydroxy and a β-hydrocarbon carboxylic acyl group containing up to 12 carbon atoms.

2. 6β,19-oxido-androstane-3,17-dione.
3. 6β,19-oxido-androstan-3β-ol-17-one.
4. 6β,19-oxido-$\Delta^1$-androstene-3,17-dione.
5. 6β,19-oxido-$\Delta^{1,4}$-androstadiene-3,17-dione.
6. A compound of the following formula:

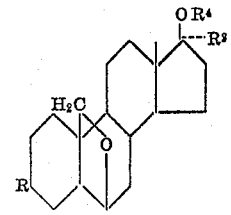

wherein R is selected from the group consisting of keto, β-hydroxy and a β-hydrocarbon carboxylic acyl group containing up to 12 carbon atoms; $R^2$ is selected from the group consisting of hydrogen and an aliphatic hydrocarbon group containing up to 8 carbon atoms; and $R^4$ is selected from the group consisting of hydrogen and a hydrocarbon carboxylic acyl group containing up to 12 carbon atoms.

7. 6β,19-oxido-androstane-3β,17β-diol.
8. 6β,19-oxido-androstane-3β,17β-diol diacetate.
9. 6β,19 - oxido - androstane - 3β,17β - diol - 3 - acetate-17-propionate.
10. 6β,19-oxido-17α-methyl-androstane-3β,17β-diol.
11. 6β,19 - oxido - 17α - ethyl - androstane - 3β,17β-diol-3-acetate.
12. 6β,19 - oxido - 17α - ethinyl - androstane - 3β,17β-diol-3,17-diacetate.
13. 6β,19-oxido-17α-vinyl-androstane-3β,17β-diol.

No references cited.